US012570156B2

(12) United States Patent
Norris et al.

(10) Patent No.: US 12,570,156 B2
(45) Date of Patent: Mar. 10, 2026

(54) ELECTRIC VEHICLE EMULATION SYSTEM AND METHOD

(71) Applicant: LORD Corporation, Cleveland, OH (US)

(72) Inventors: Mark Norris, Fuquay-Varina, NC (US); Florin Barbulescu, Fuquay-Varina, NC (US); Karl Kintz, Apex, NC (US); Martin Bieber, Apex, NC (US)

(73) Assignee: LORD Corporation, Cleveland, OH (US)

( * ) Notice: Subject to any disclaimer, the term of this patent is extended or adjusted under 35 U.S.C. 154(b) by 114 days.

(21) Appl. No.: 18/571,318

(22) PCT Filed: Jun. 23, 2022

(86) PCT No.: PCT/US2022/034772
§ 371 (c)(1),
(2) Date: Dec. 18, 2023

(87) PCT Pub. No.: WO2022/271977
PCT Pub. Date: Dec. 29, 2022

(65) Prior Publication Data
US 2024/0278651 A1     Aug. 22, 2024

Related U.S. Application Data

(60) Provisional application No. 63/214,654, filed on Jun. 24, 2021.

(51) Int. Cl.
B60L 15/20 (2006.01)
G10K 15/04 (2006.01)

(52) U.S. Cl.
CPC .............. B60L 15/20 (2013.01); G10K 15/04 (2013.01); *B60L 2240/12* (2013.01); *B60L 2250/26* (2013.01); *B60L 2270/42* (2013.01)

(58) Field of Classification Search
CPC .. B60L 15/20; B60L 2240/12; B60L 2250/26; B60L 2270/42; B60L 1/00; B60L 50/50; B60L 2240/14; B60L 2240/423; B60L 2270/142; B60L 2270/145; B60L 50/60; G10K 15/04; B60K 35/25; B60Q 5/005; B60Y 2200/91
See application file for complete search history.

(56) References Cited

U.S. PATENT DOCUMENTS

2022/0063494 A1 *   3/2022   Duo' ........................ H04R 1/02

* cited by examiner

*Primary Examiner* — Alan D Hutchinson
(74) *Attorney, Agent, or Firm* — McAfee & Taft

(57)     ABSTRACT
An electric vehicle emulation system and method is provided using at least one force generator (FG) to induce a vibration emulating the feel of an internal combustion engine in an all-electric, hybrid-electric, or alternative fuel vehicle. The FG may be a circular FG (CFG), a linear FG (LFG), or a combination of both CFGs and LFGs.

33 Claims, 10 Drawing Sheets

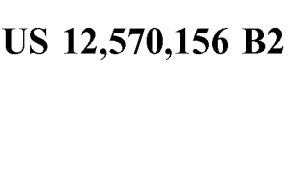

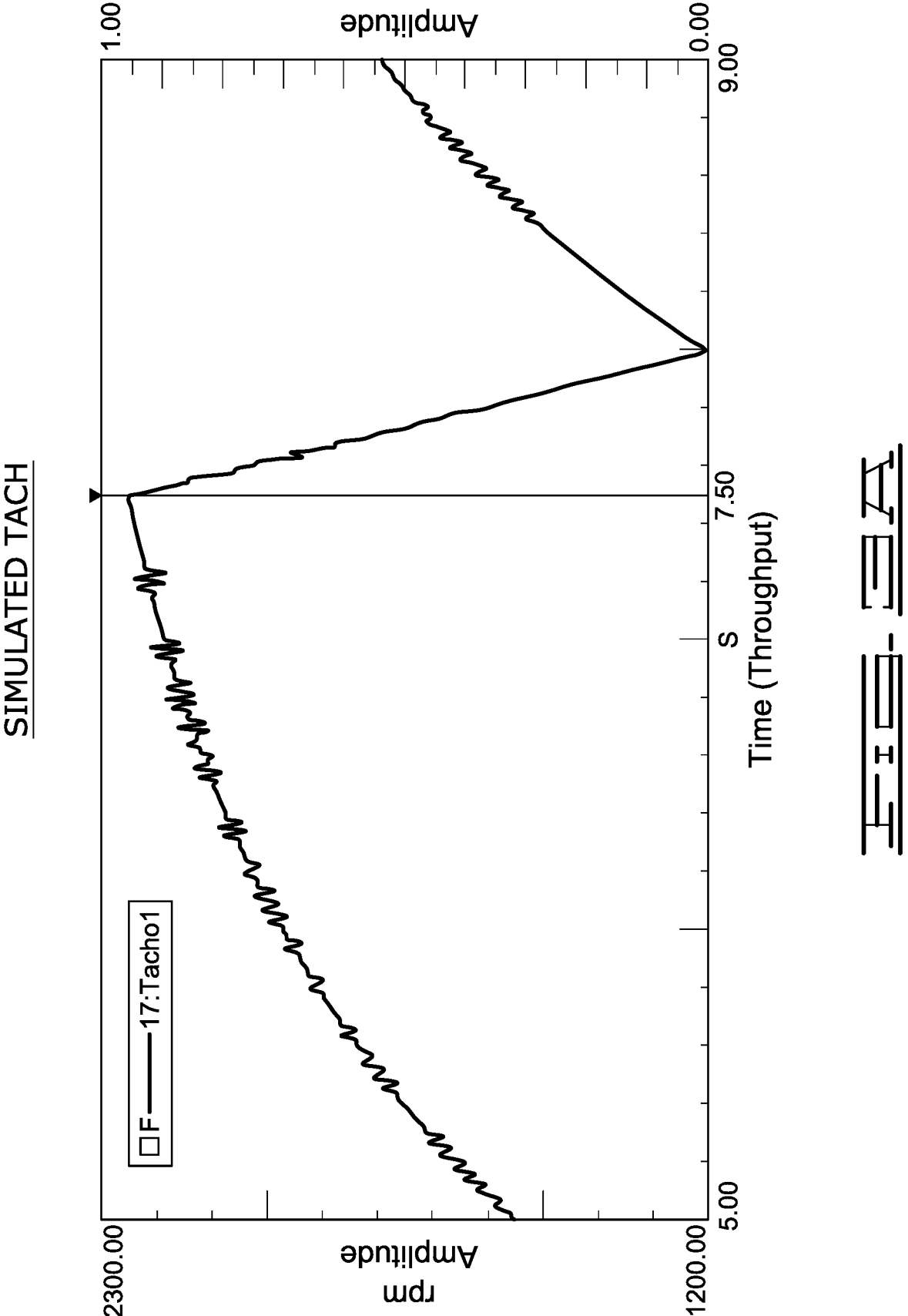

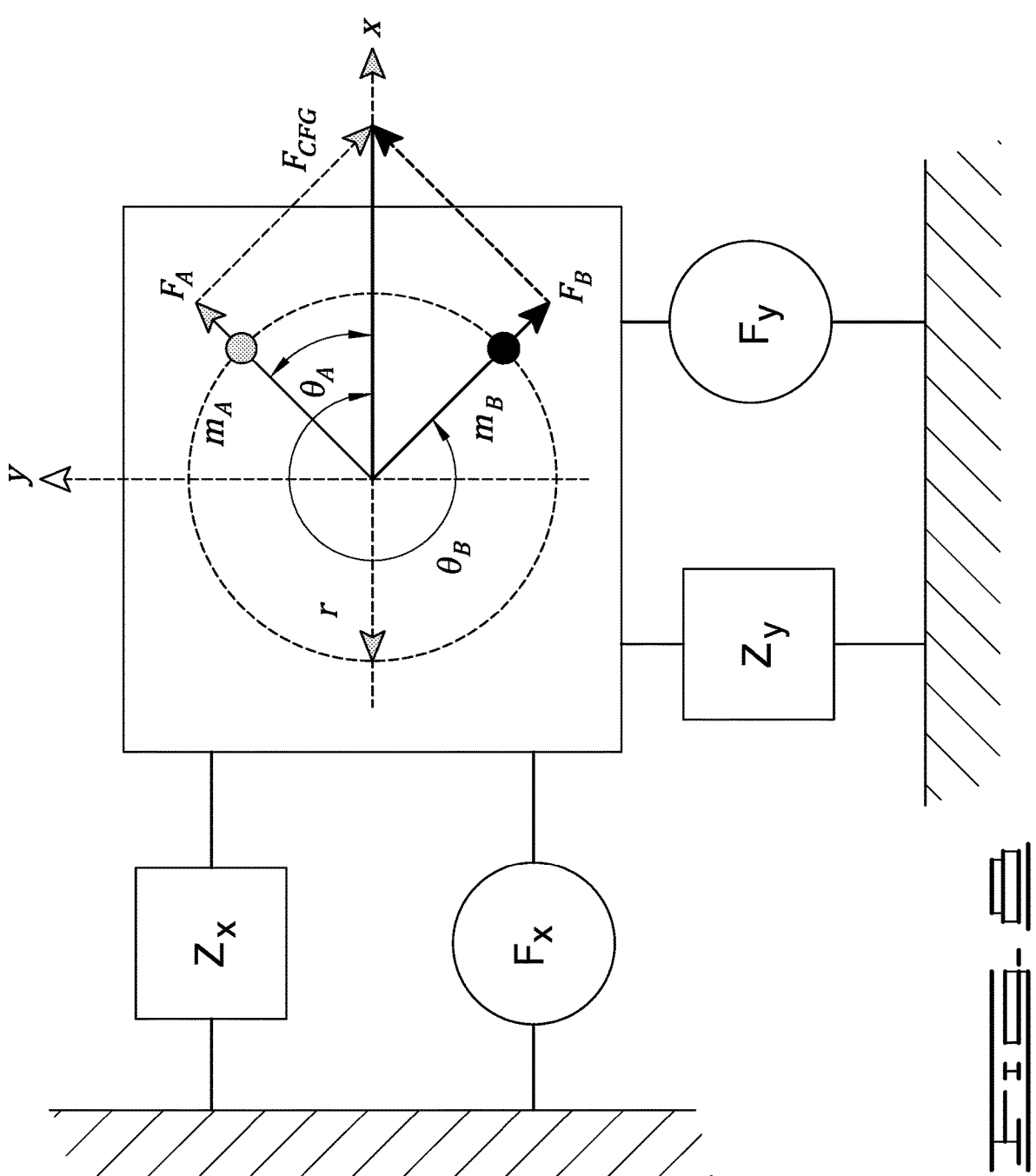

ELECTRIC VEHICLE EMULATION SYSTEM AND METHOD

CROSS-REFERENCE TO RELATED APPLICATIONS

The present application claims priority to U.S. Provisional Application No. 63/214,654 filed on Jun. 24, 2021 which is incorporated herein.

FIELD OF INVENTION/BACKGROUND

The subject matter disclosed herein generally relates to vibration control and methods for emulating the feel of an internal combustion engine, also referred to as ICE, while operating an all-electric, hybrid-electric, or alternative fuel vehicle.

BACKGROUND

With increased interest in all-electric, hybrid-electric, or alternative fuel vehicles, some brands of vehicles may lose some of the cache attributable to an internal combustion engine. Much of the cache comes from the vibrations felt by the passengers within the passenger cabin. In some internal combustion engine vehicles, the passengers want to feel the one or more vibrations tied to the engine and its revolutions per minute (RPM), the gears shifting, and/or the feeling of vibrations generated from the exhaust system. These feelings may be part of a brand identity or a desired option for a particular type or style of a vehicle. Yet, the owners of the vehicle are also interested in being environmentally conscientious and have chosen all-electric, hybrid-electric, or alternative fuel vehicles. Thus, the desire to have a vehicle that feels traditional yet is more consistent with the desire to be environmentally aware.

What is needed is a vibration inducing system to create a feel that emulates an internal combustion engine.

SUMMARY OF THE INVENTION

In one embodiment the present disclosure describes a system for emulating the feel of an internal combustion engine during the operation of an electric vehicle. The emulation system includes: an electric vehicle having a chassis; an electric motor supported by the chassis; an accelerator, the accelerator controls operation of the electric motor; at least one data source capable of providing data representative of changes in operation of said electric vehicle; at least one force generator controller, the force generator controller in data communication with the at least one data source, the force generator controller programmed to produce a demand signal in response to data received from the at least one data source and the force generator controller configured to transmit the demand signal to a force generator; the force generator configured to produce vibrations upon receipt of the demand signal from the force generator controller.

In another embodiment the present disclosure provides a method of emulating the feel of an internal combustion engine during the operation of an electric vehicle comprising: the electric vehicle comprises: a chassis; an electric motor supported by the chassis; an accelerator, the accelerator configured to control operation of the electric motor; at least one data source capable of providing data representative of changes in operation of said electric vehicle; at least one force generator; a force generator controller, the force generator controller programmed to receive data from the at least one data source and programmed to generate a demand signal suitable for controlling operation of a force generator and the force generator controller configured to transmit the demand signal to the force generator; the force generator configured to produce vibrations upon receipt of the demand signal from the force generator controller;

using the data source to monitor changes in the operation of said electric vehicle and produce data representative of changes in operation of said electric vehicle transmitting data representative of changes in operation of the electric vehicle to the force generator controller; the force generator controller receiving the data representative of changes in operation of the electric vehicle and the force generator controller generating a demand signal;

transmitting the demand signal from the force generator controller to the force generator;

using the force generator to produce vibrations which emulate changes in operation of an internal combustion engine corresponding to the data representative in operation of said electric vehicle.

BRIEF DESCRIPTION OF THE DRAWINGS

FIG. 2 illustrates force generators generating a force at 35 Hz with the force modulated for emulating an internal combustion engine at idle.

FIGS. 3A and 3B illustrate the emulation of a V8 internal combustion engine vehicle on a passenger side of the vehicle frame when the vehicle is moving and the gears are shifting.

FIG. 6 depicts an electrical schematic for an example of a linear force generator.

DETAILED DESCRIPTION

Throughout this disclosure, the terms "about", "approximate", and variations thereof, are used to indicate that a value includes the inherent variation or error for the device, system, or measuring method being employed as recognized by those skilled in the art.

Figure 1:
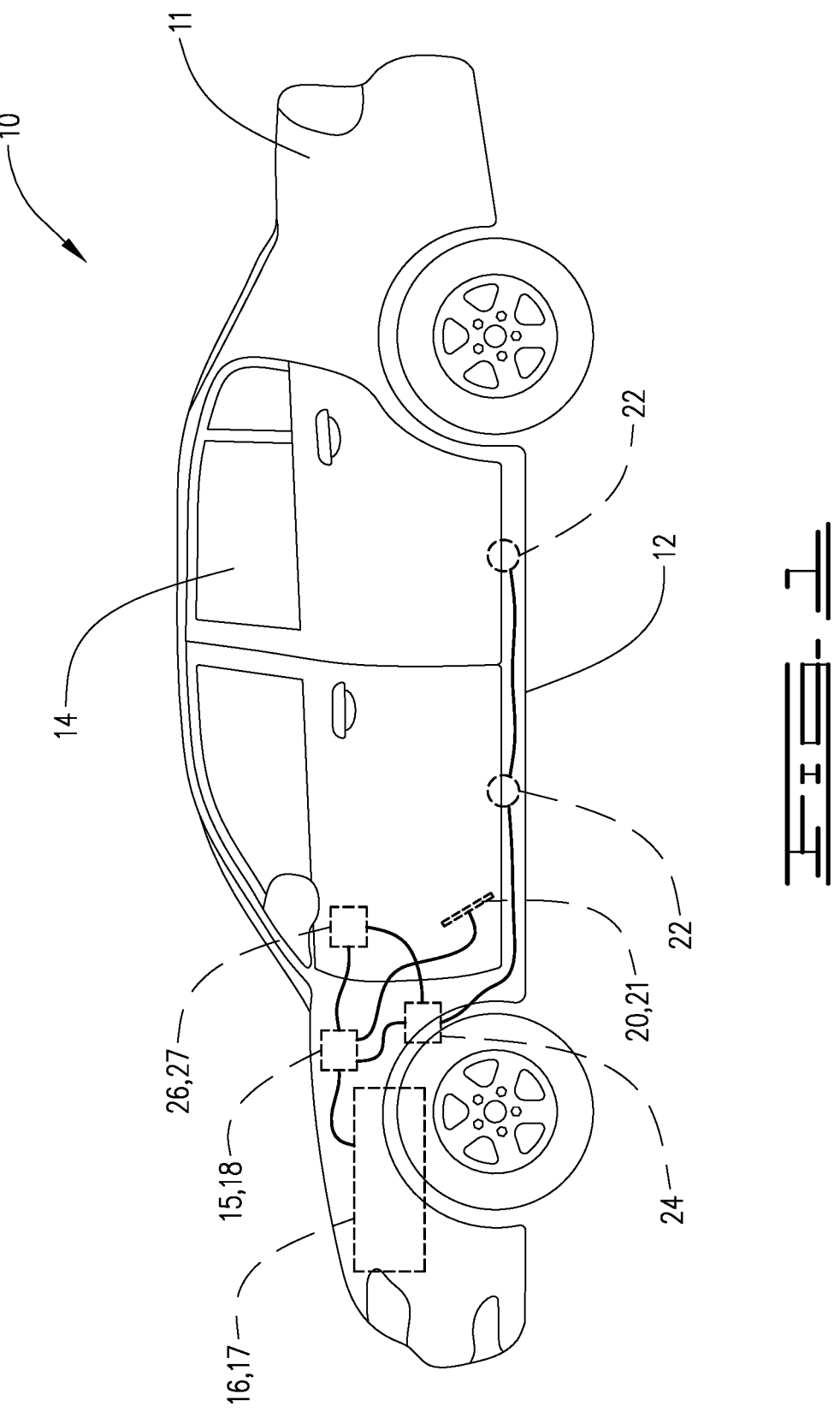
FIG. 1 illustrates a schematic of an electric vehicle.
Figure 3B:
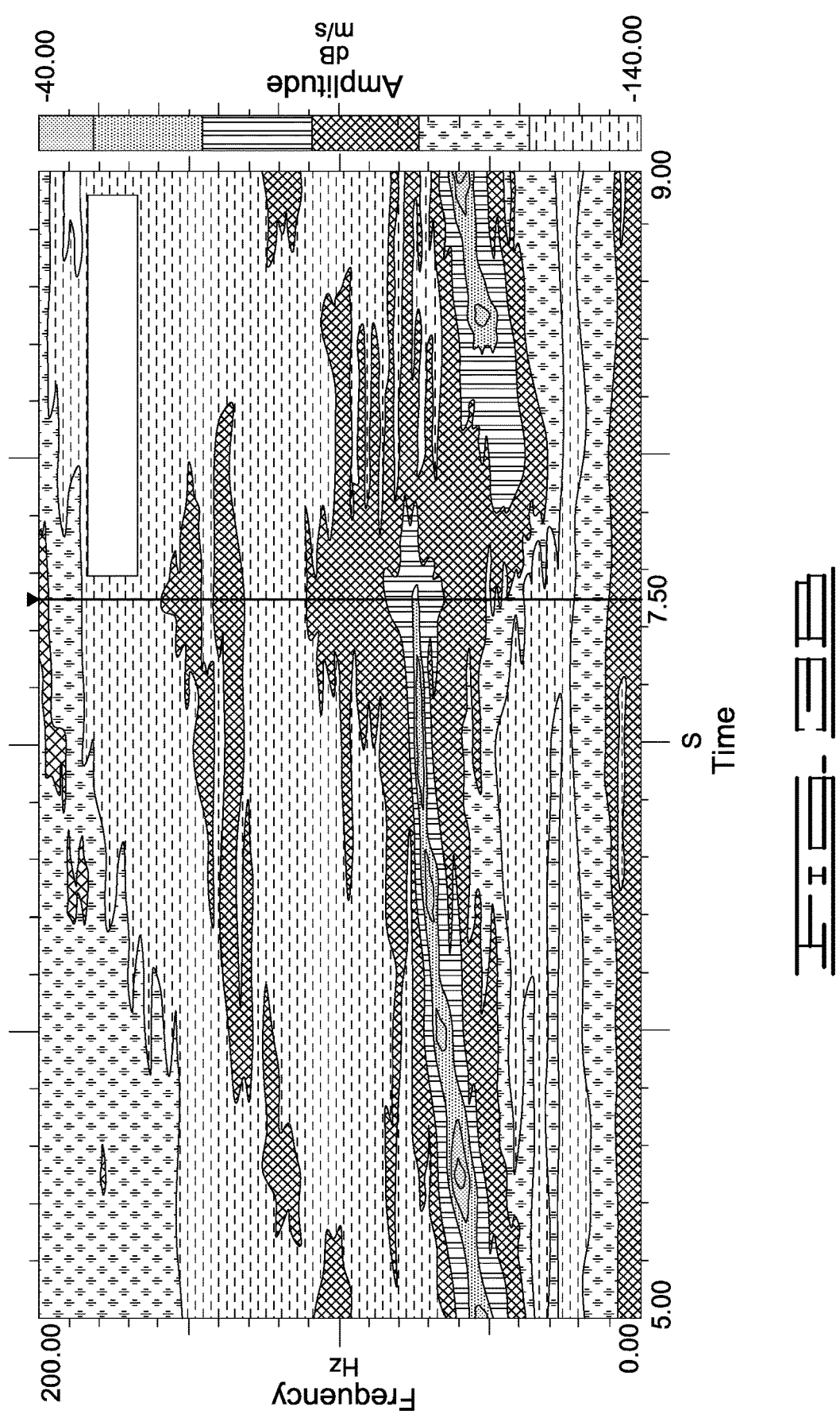
Figure 4A:
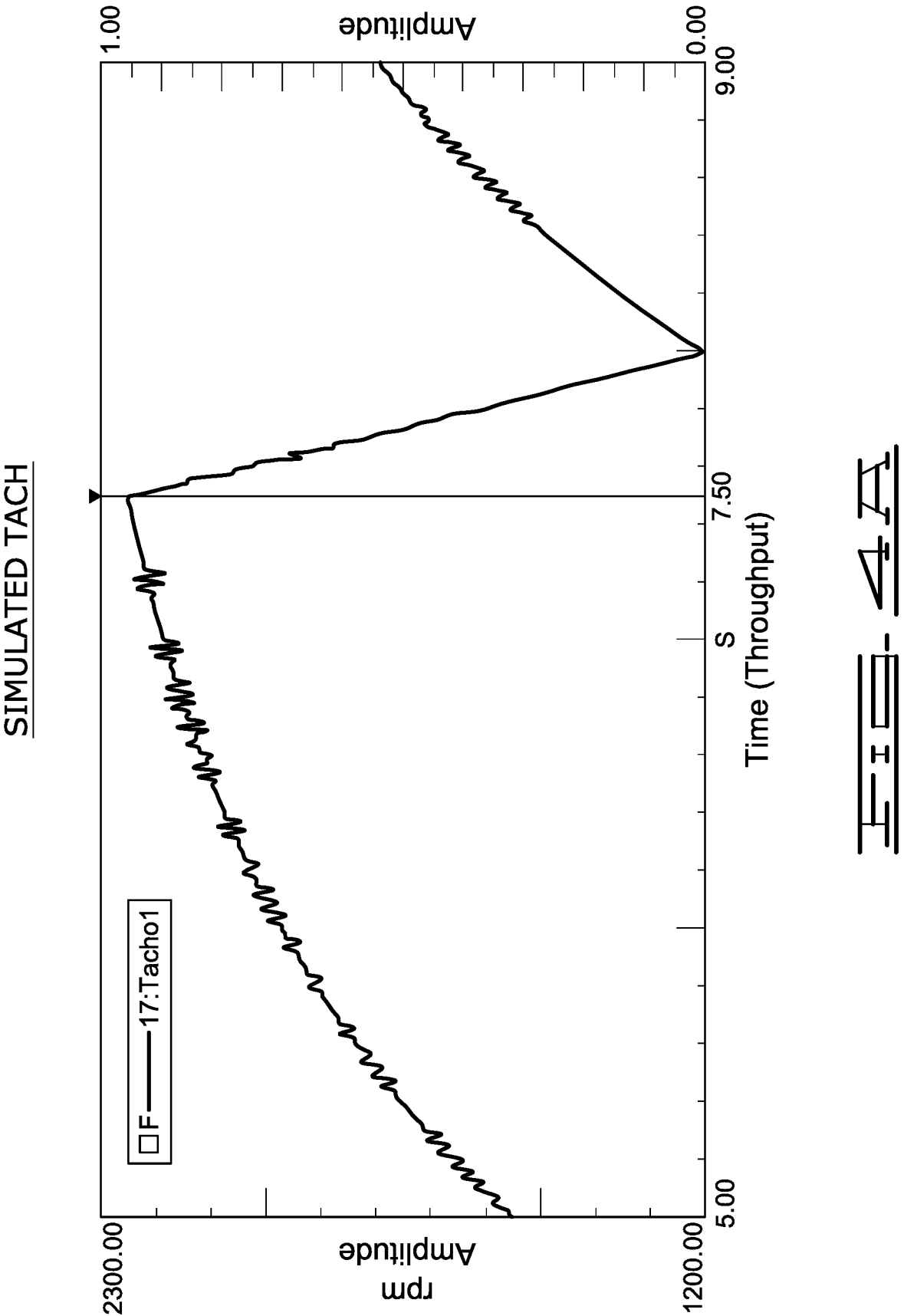
FIGS. 4A and 4B illustrate the emulation of a V8 internal combustion engine vehicle on a driver side of the vehicle frame when the vehicle is moving and the gears are shifting.
Figure 4B:
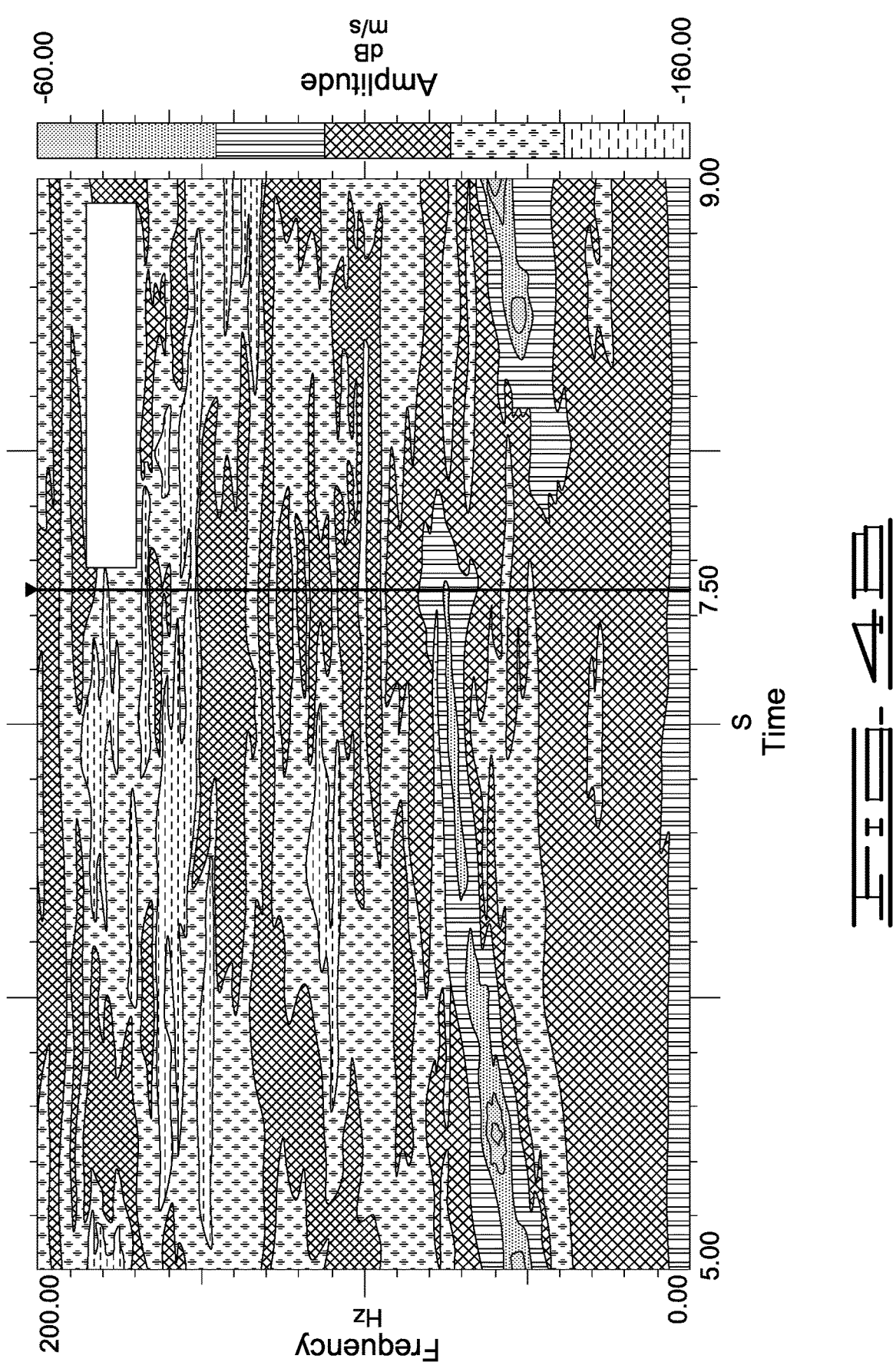

Referring to FIGS. 1-5, a system to emulate an internal combustion engine vehicle's feel is disclosed. FIG. 1 illustrates an electric vehicle 10 with a chassis 12, a passenger cabin 14, an electric motor 16, a CAN BUS network 18, an accelerator 20, at least one force generator (FG) 22, and at least one FG controller 24. Any suitable control mechanism may serve as accelerator 20; however, FIG. 1 depicts a common foot pedal. Additional sensors such as a vehicle speed sensor 15 and an accelerator position sensor 21 are also present as part of the original equipment of electric vehicle 10. Such sensors may be located at any convenient location suitable carrying out their purpose. Further, electric motor 16 will commonly include an electric motor controller 17. These components and sensors provide data to CAN BUS network 18 as does electric motor controller 17 and FG controller 24. As used herein, the terms electric vehicle 10 and electric motor 16 are not meant to be limiting to an all-electric vehicle. Instead, electric vehicle 10 and electric motor 16 are meant to be inclusive of all-electric vehicles operating with an electric motor, hybrid-electric vehicles operating with a hybrid electric motor-internal combustion engine, and alternative fuel vehicles operating with fuel cells and other alternative fuels.

As known to those skilled in the art, the chassis, or frame, forms the basis for the rest of the vehicle. Everything else is built on the chassis. The chassis may also include other components, such as suspension, brakes, drivetrain and steering linkage. Modern vehicles typically have one of two different styles of chassis: Unibody or body-on-frame. With the exceptions of pickup trucks or large SUVs, most vehicles have a unibody chassis. This means that the body—the thing that gives the car its exterior shape—and the chassis are all part of the same assembly. As used herein, the term chassis refers to both a body-on-frame configuration and a unibody configuration.

Figure 8:
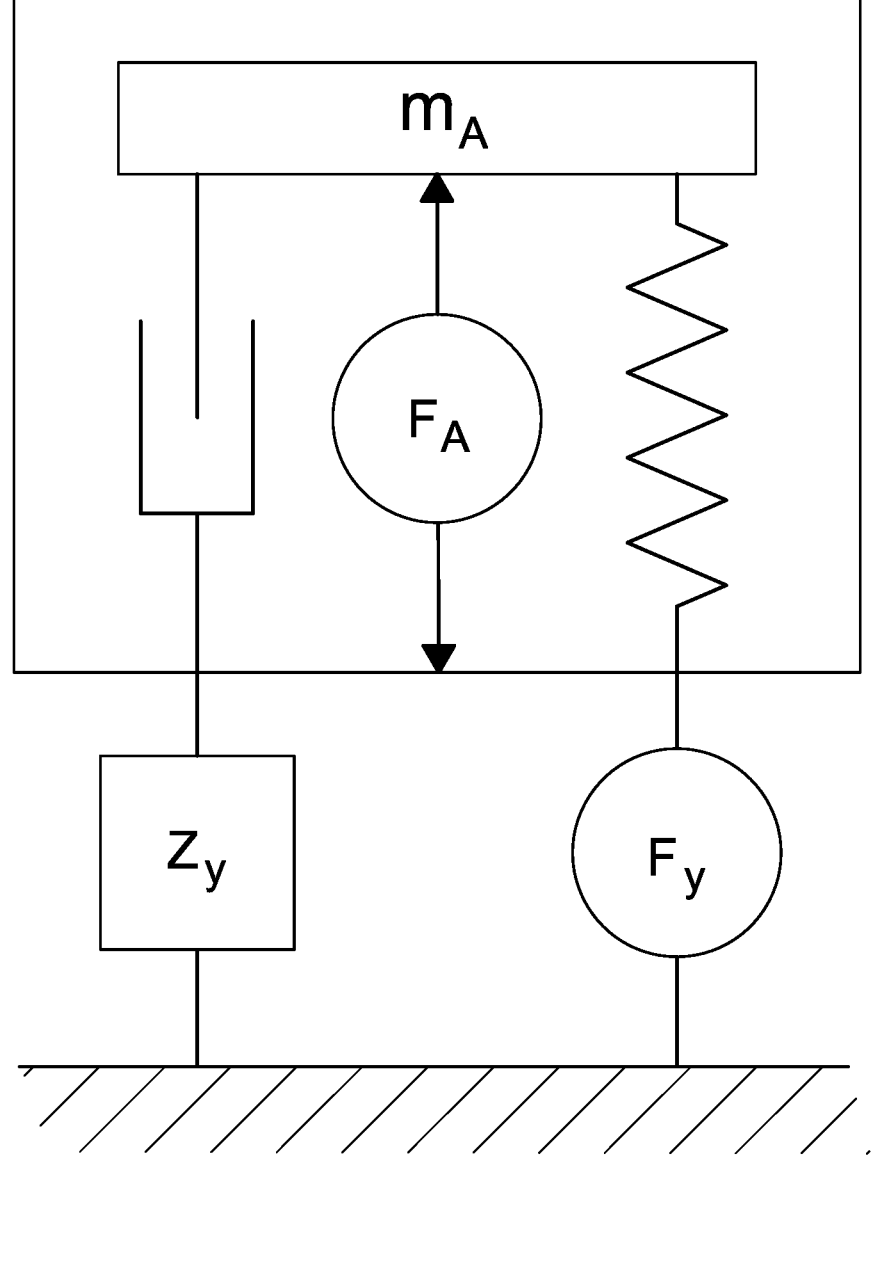
FIG. 8 depict an electrical schematic for an example of a circular force generator.
Figure 7:
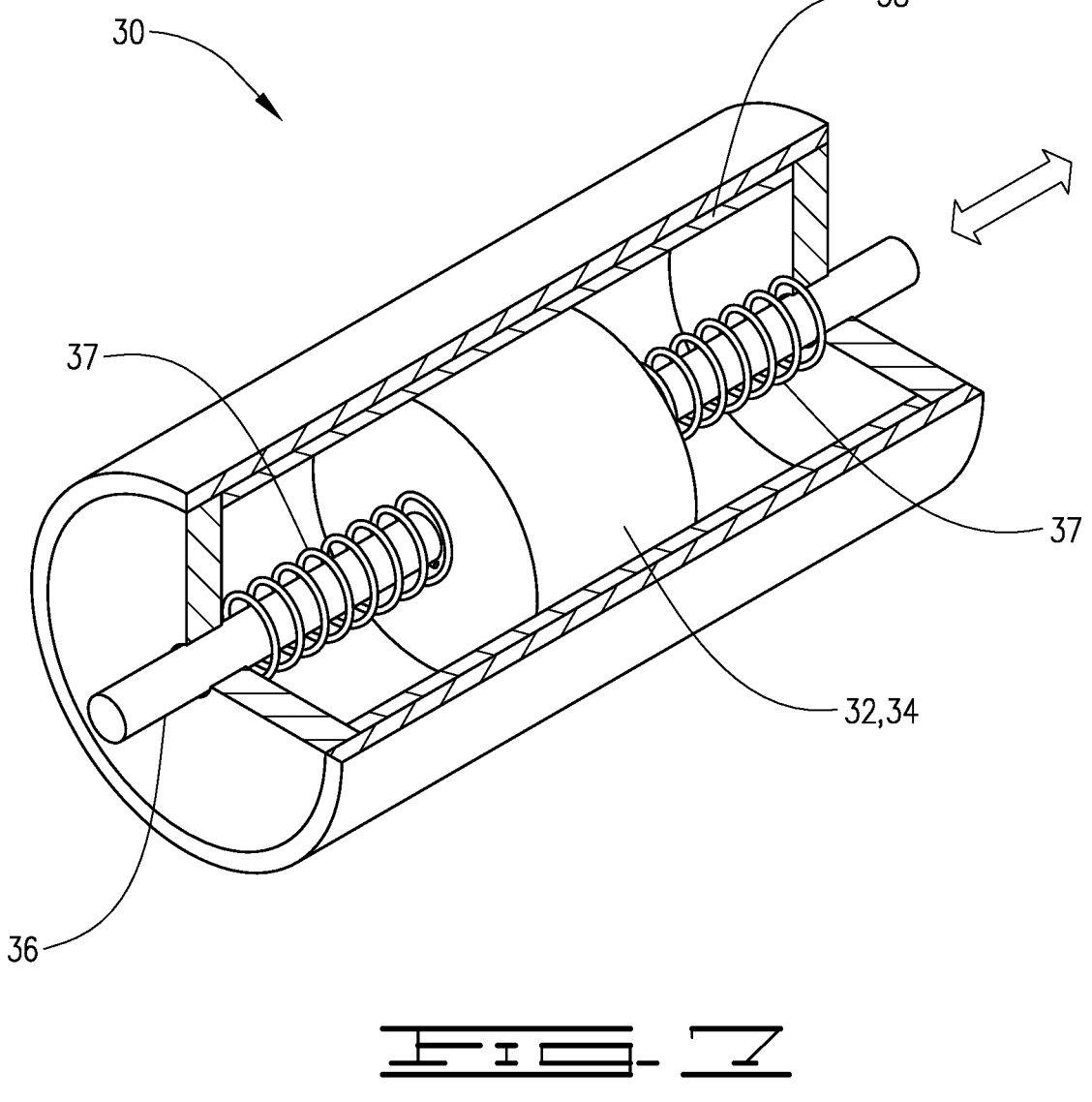
FIG. 7 is a partial cut-away view of an example of a linear force generator.

The construction and use of FGs 22 are well known to those skilled in the art. Therefore, the make-up and operation of linear and circular force generators will not be discussed in detail. As known to those skilled in the art, FGs 22 are commonly used to control vehicle vibration; however, in the emulation system, the at least one FG 22 provides the ability to generate vibrations in electric vehicle 10 such that the operational feel emulates existing and historic internal combustion engine vehicles. Thus, the disclosed emulation system creates an experience corresponding to operation of an internal combustion engine vehicle while enjoying the benefits of electric vehicle 10. The at least one FG 22 may be a circular FG (CFG), a linear FG (LFG), or a combination of both CFGs and LFGs. FIG. 6 depicts a typical electrical schematic of a linear force generator and FIG. 8 depicts an electrical schematic of a typical circular force generator. As known to those skilled in the art, a linear force generator 30, as depicted in FIG. 7, includes a mass 32. In this instance mass 32 corresponds to a magnet 34 movably supported on a shaft 36. At least one spring 37 provides centering force to magnet 34. Finally, linear force generator 30 includes a coil 38. Activation of coil 38, in response to a demand signal from FG controller 24, produces movement in magnet 34 resulting in the generation of vibrations.

The schematic provided in FIG. 8 corresponds to a circular force generator having two rotating imbalance masses spinning in the same direction (co-rotating) and at the same frequency as the rotating force vector is controlled. Both eccentrics (mA and mB) create rotating forces vectors by their respective centrifugal forces that can be vectorially summed to create a controllable rotating force vector also rotating at the same frequency. However, other circular force generators will perform satisfactorily in the emulation system.

In one embodiment, the emulation system includes at least one FG 22 attached to or integrated with the chassis 12 and/or the passenger cabin 14. The emulation system also includes at least one FG controller 24 in electronic communication with the at least one FG 22 and the CAN BUS network 18. FG controller 24 receives data via CAN BUS network 18 from a variety of data sources selected for their ability to convey data representative of changes in vehicle operation. In particular, the data source should provide data that may be interpreted and applied for the purpose of generating a signal for emulating the operation of a vehicle powered by an ICE. Such data sources may include a vehicle speed sensor 15, an accelerator position sensor 21 and an electric motor controller 17. Data received from electric motor controller 17 will typically correspond to the current torque or power demand placed on electric motor 16. FG controller 24 includes programming suitable for interpreting and using the data received from these data sources to generate a demand signal. FG controller 24 is also programmed to transmit the demand signal to FG 22. The demand signal controls FG 22 and instructs FG 22 to generate vibrations corresponding to the then current operational condition of vehicle 10.

In another embodiment, FG 22 may be attached to or integrated with locations other than chassis 12. For example, FG 22 may be incorporated into passenger cabin 14, the only limitation on the location of FG 22 relates to the ability to induce at least one vibrational pattern or resonance based upon the vehicle speed and/or position of the accelerator 20. As noted above, in some instances chassis 12 may be in the configuration of a unibody. Since unibody vehicles lack a traditional frame, the location of FG 22 may be any convenient location suitable for transmitting the desired vibrations to the occupants of the vehicle's passenger cabin. Likewise, for vehicles having a separate frame as chassis 12, FG 22 may be incorporated into the frame or as part of body 11 so long as the location conveys vibrations to occupants within passenger cabin 14. Thus, one or more FGs 22 may be secured under the seats, in contact with the steering control mechanism, behind door panels and positioned to manipulate the hood and trunk lid of vehicle 10. Use of multiple FGs 22 will enhance the overall emulation of an internal combustion engine.

As described above, each FG 22 will receive a demand signal from FG controller 24 directing operation of FG 22 to produce vibrations sufficient to emulate the feel of an internal combustion engine vehicle to at least one passenger within the passenger cabin 14. The generated vibrations travel through body 11 of vehicle 10 to passenger cabin 14 or through chassis 12 to body 11 and passenger cabin 14.

In another embodiment, the emulation system further includes an acoustic emulator sub-system. Acoustic emulator sub-system includes an acoustic emulator 26 and an acoustic emulator controller 27. As depicted in FIG. 1, at least one FG controller 24, CAN BUS network 18, and optional acoustical emulator controller 27 are all directly or indirectly in electronic communication with each other. As illustrated, at least one FG controller 24 is in electronic communication with both CAN BUS network 18 and the optional acoustic emulator controller 27. Acoustic emulator 26 may be any one or more conventional audio speakers configured to produce sounds corresponding to the frequency range of engine noise and/or engine exhaust noise. When the emulation system includes the optional acoustic emulator sub-system, the two systems must be coordinated in order to produce the desired emulation of an ICE. Coordination of the systems will be discussed below in the description of the method of emulating an ICE.

The passengers' emulated "feel" of an internal combustion engine vehicle is controlled by the at least one FG controller 24 and the CAN BUS network 18. Emulation of an internal combustion engine vehicle is both a physical feeling and an auditory sensation by the at least one passenger. Therefore, to further enhance the emulation of an internal combustion vehicle, acoustic emulator controller 27 receives the same data from CAN BUS network 18 as FG controller 24, i.e. vehicle speed data, accelerator position data and electric motor 16 torque or power demand. Acoustic emulator controller 27 includes programming which interprets the received data and generates an audio demand signal. Acoustic emulator controller is also programmed to transmit the audio demand signal to acoustic emulator 26. Acoustic emulator 26 upon receipt of the audio demand signal generates an audio output corresponding to the current operational condition of the vehicle. For example, during acceleration, acoustic emulator may emit an audio output corresponding to any desired internal combustion engine increasing in RPM while also emulating the sound of the engine exhaust under such conditions. Likewise, during deacceleration, acoustic emulator 26 will receive an appropriate audio demand signal directing the production of audio output corresponding to the change in engine speed.

The emulation system disclosed herein provides at least four modes of interest. The first mode is an idle mode where the electric vehicle 10 is in a stopped/non-moving position. In this mode the emulation system provides the sensation of an internal combustion system operating while idling between 600 revolutions per minute (RPM) and 5000 RPM as the position of the accelerator 20 changes. The at least one FG 22 creates a vibration that emulates the RPM of the internal combustion engine that is idling with an operating increasing or decreasing the RPM demand on the engine. In one embodiment for the idle mode, the electric vehicle 10 is in a stopped position and will not move as the accelerator 20 is changed. In one embodiment for the idle mode, the electric vehicle 10 is able to emulate similar changes in an internal combustion engine RPM change as the accelerator 20 is changed. In a non-limiting example, a sports car is the electric vehicle 10 and the operator wishes to have the feeling of the engine "revving" and "creating engine power" as the operator depresses and releases the accelerator 20 while the electric vehicle is motionless, for example when the transmission is in neutral.

In the second mode the emulation system provides a sensation of acceleration/deceleration emulating the internal combustion engine vehicle in motion. The emulation creates the feeling of the demand on an internal combustion engine as the vehicle accelerates, decelerates, is in a cruise condition, and/or has a load change (e.g., going up or down steep hills). In this mode, FG controller 24 generates the demand signal in response to data received from at least accelerator position sensor 21 corresponding to the position of accelerator 20. More typically, FG controller 24 will receive via CAN BUS network 18 data from accelerator position sensor 21, vehicle speed sensor 15 and information relating to torque/power demand on electric motor 16 from electric motor controller 17. FG controller 24 programming calibrates the received date to determine an analogous RPM of an internal combustion engine vehicle in motion. Then FG controller 24 transmits a signal directing operation of FG(s) 22 to create vibrations emulating the sensation corresponding to the speed of the electric vehicle including whether or not the vehicle is accelerating, decelerating, or cruising. In a non-limiting example, the electric vehicle 10 operator wishes to have the feedback of the engine running while in motion and the at least one FG 22 induces vibrations in response to the demand signal that emulate the demand on the engine for a given speed and/or load. Thus, the emulation system controls and directs FG(s) 22 to emulate and track what would be an acceleration/deceleration event for an internal combustion engine change in RPM in response to accelerator position and/or other received data.

The third mode is a gear shift mode that emulates an internal combustion engine vehicle having a transmission going through the various gear shifts as the internal combustion engine vehicle is accelerating or decelerating. The electric vehicle undergoes changes in the felt vibrations from the at least one FG 22 during gear shift mode emulation and as the electric vehicle 10 accelerates or decelerates. Based upon speed, acceleration/deceleration, and demand from the accelerator the emulated feeling changes for the at least one passenger. In a non-limiting example, a sports car is the electric vehicle 10 and the operator wishes to rapidly accelerate yet wishes to have that sensation of gears shifting. In this example, the operator feels a change of the vibrations that emulate like those of an internal combustion engine sports car undergoing a gear change. There can be any number of emulated gear shift changes for the electric vehicle 10.

The fourth mode is a safety enhancement mode where the at least one FG 22 provides additional feedback based upon an unsafe condition. For example, an owner of the electric vehicle 10 may wish to create a speed governor that allows the operator of the electric vehicle 10 to exceed a set speed, but introduces an unpleasant vibration felt through the passenger cabin 14 by all occupants. Similarly, the same owner may wish to enhance existing safety warning devices such as lane departure warnings so that all passenger cabin 14 occupants feel the vibration(s) when the electric vehicle inadvertently departs a set lane. In a non-limiting example, the at least one FG 22 is driven on/off (neutralized) at a frequency in the range of 0.5 to 2 Hz to create the enhanced safety warning.

All four modes are capable of being seamlessly integrated together and/or can be individually implemented by the original equipment manufacturers (OEMs). Depending upon the OEM desires, one or more of the modes may be user/owner selectable, emulation specific (i.e., tied to a specific internal combustion engine), and/or may be operator/owner controlled/set. These tunable options related to the vibration from the at least one FG 22 are based upon a preset choice of options, such as the immediately preceding examples.

In each mode, FG controller transmits a demand signal directing operation of FG(s) 22 to create the desired vibration corresponding to the action to be simulated. In order to generate the demand signal, FG controller 24 receives via CAN BUS network 18 data from accelerator position sensor 21, vehicle speed sensor 15 and information relating to torque/power demand on electric motor 16 from electric motor controller 17. FG controller 24 programming calibrates the received date to determine the necessary vibrations the desired emulation mode. Then FG controller 24 transmits a signal directing operation of FG(s) 22 to create vibrations corresponding to the one or operational modes. Thus, the resulting demand signal controls and directs FG(s) 22 to produce vibrations which pass to passenger cabin 14 and produce the operational "feel" of an internal combustion powered vehicle experiencing the same operational conditions.

If the optional acoustical emulator controller 27 is paired with the at least one FG controller 24, the combination of the two are able to synchronize and emulate both the feel and the sound of an internal combustion engine vehicle. In this embodiment, either emulator controller 27 or FG controller 24 may be programmed to manage the overall operation of the emulation system. Either controller will coordinate and manage operation of the other controller to ensure simultaneous operation of FG(s) 22 and acoustic emulator(s) 26 thereby providing a seamless emulation of an ICE operating under the particular conditions at that time.

Referring to FIG. 2, a non-limiting example using the emulation system describe above is illustrated. The graph of FIG. 2 represents operating the emulation system in a manner to emulate the idling of an 8-cylinder internal combustion engine. In general, an 8-cylinder ICE idles at about 600 RPM or 10 Hz with an exhaust pulse frequency of 40 Hz and a complete-firing-order frequency of 5 Hz. To emulate this operation, FG 22 vibration frequency will commonly be around 40 Hz as this frequency will readily transfer through and into the vehicle structure 11. In the example of FIG. 2, FG 22 generates vibrational force at a frequency of 35 Hz, which is assumed to be the electric vehicle body mode/resonance in the example. The vibrational force from the at least one FG 22 is modulated at 5 Hz to match the nominal complete-firing order frequency. For example, a 50% nominal duty cycle pulse width modulation where the at least one FG 22 goes from a set force to zero force with a random deviation in the period. Finally, to simulate the random variation in idle RPM, a random jitter may be applied to the modulation of FG 22 vibrations.

FG(s) 22 suitable for use in the emulation system may produce between 0.5 Newtons of force and about 60 Newtons of force. Typically, FG(s) 22 are selected based on the size of electric vehicle 10 and the desired internal combustion engine to be emulated, e.g. V8, V6, 14, and/or turbo-charged engines. FG(s) 22 will produce forces necessary to shake the passenger cabin 14 and create the emulated feeling. If necessary, larger FG(s) 22 with larger force capabilities may be used. Also, combinations of more than one FG 22 may be used to emulate the feeling of an internal combustion engine vehicle.

Referring to FIGS. 3A-4B, a non-limiting example of a gear shift mode is illustrated on a passenger side (FIGS. 3A and 3B) and on a driver side (FIGS. 4A and 4B) of the passenger cabin 14. In these examples, at least one FG(s) 22 generates a vibration force at frequency between 0 Hz and 200 Hz based upon a measured acceleration of an internal combustion engine vehicle in motion. Corresponding with the frequency, the simulated internal combustion engine is operating between 2400 RPM and 4600 RPM. When the example vehicle shifts gears, the frequency and vibration felt on the passenger's side and the driver's side of the passenger cabin 14 drops with the change in RPM. The example data shows that the frame and seat vibration changes through RPM due to the electric vehicle 10 and passenger cabin 14 resonances at different frequencies.

Figure 5:
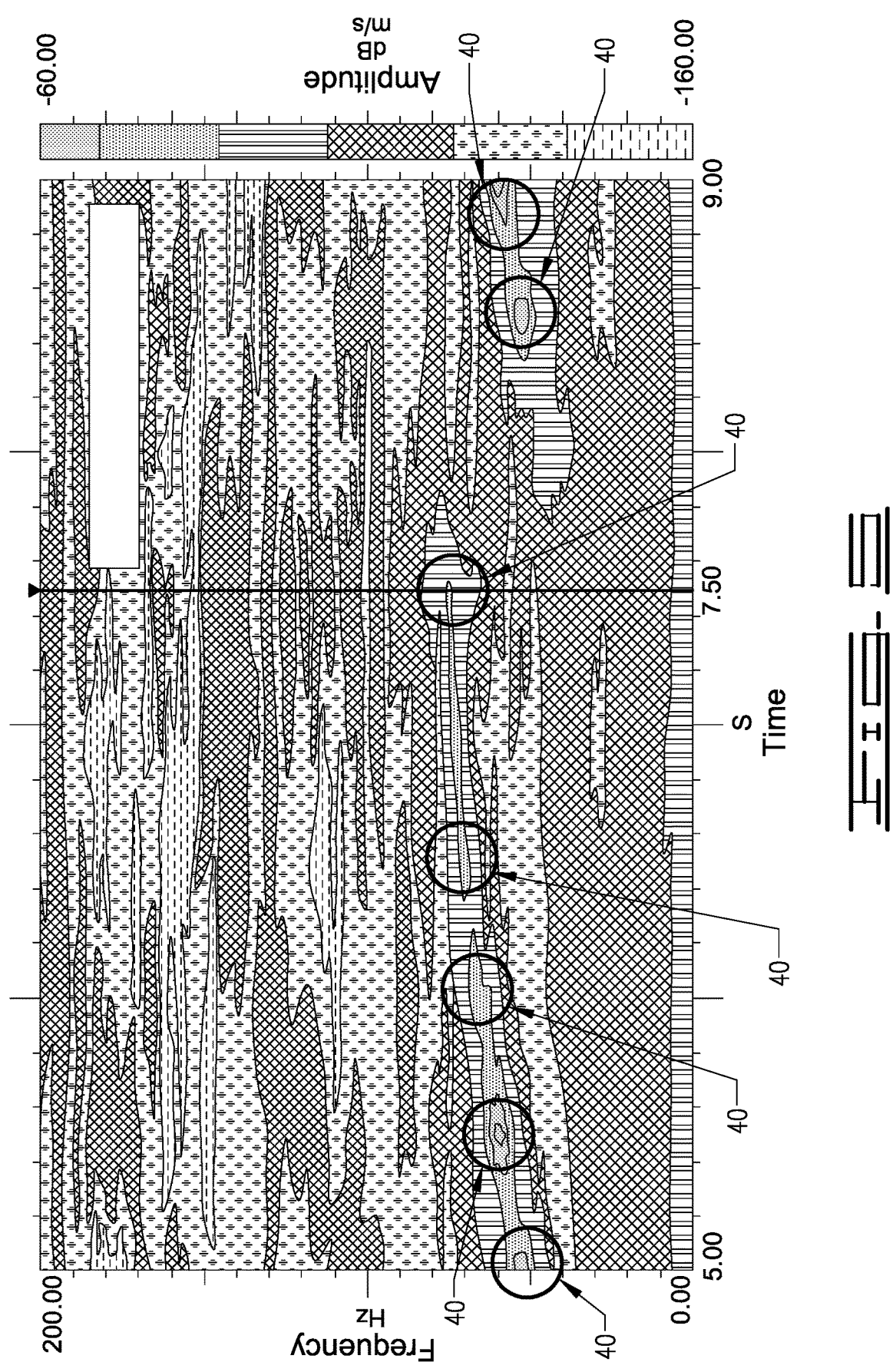
FIG. 5 illustrates the emulation of a V8 internal combustion engine vehicle gear shift transient vibration.

Referring to FIG. 5, another non-limiting example illustrates transient hot spots 40 during acceleration of an internal combustion engine vehicle. Hot spots 40 indicate the vibration input necessary for a typical V8 internal combustion engine and the associated change in RPM as the vehicle accelerates and changes gears about around 7.5 seconds. These hot spots 40 indicate the timing and manner in which at least one FG 22 will induce a vibration at the same frequency based upon the emulated internal combustion engine's RPM.

A method of emulating the internal combustion engine in electric vehicle 22 is provided. In this method, CAN BUS network 18 provides data communication between vehicle speed sensor 15, accelerator position sensor 21, electric motor controller 17, FG controller 24 and optional acoustic emulator controller 27. In some embodiments, FG(s) 22 and optional acoustic emulator(s) 26 may receive signals from FG controller 24 and optional acoustic emulator controller 27 via CAN BUS network; however, in most instances FG controller 24 will have a direct link to FG(s) 22 and optional acoustic emulator controller 27 will have a direct link to optional acoustic emulator(s) 26. In response to operational changes in vehicle 10, FG controller 24 will receive data from vehicle speed sensor 15, accelerator position sensor 21, electric motor controller 17. The data will reflect changes in vehicle speed, alteration in the position of accelerator 20 and current torque or power demand on electric motor. To emulate the response commonly produced by an ICE, programming within FG controller 24 will interpret the data, generate a demand signal and transmit the demand signal to FG(s) 22. The demand signal includes the necessary information to control and direct operation of FG(s) 22. Thus, each FG 22 will produce a vibration which can be sensed within passenger cabin 14. Since FG 22 is secured to chassis 12, a predetermined body panel or a location within passenger cabin 14 of vehicle 10, the resulting vibrations pass to passenger cabin 14 emulating an operational condition of an internal combustion engine such that passengers in passenger cabin experience a "feel" corresponding to the operation of a vehicle powered by an internal combustion engine. Thus, based upon the demand signal received from at least one FG controller 24, at least one FG 22 creates a vibration force that emulates the operational characteristic of vehicle powered by an internal combustion engine.

When an acoustical emulator sub-system is included as part of the emulator system, FG controller 24 and acoustic emulator controller 27 will be programmed to provide synchronous operation of FG(s) 22 and acoustic emulator 26. Further, to provide the desired emulation, acoustic emulator controller 27 will receive the same data as FG controller 24. Either acoustic emulator controller 27 or FG controller 24 may take primary control of emulation operations. If FG controller 24 has primary control, then FG controller will be programmed to manage data signals such that upon directing operation of acoustic emulator controller 27, the timing of the demand signal from FG controller 24 will arrive at FG(s) 22 at the same time as acoustic emulator 26 receives the audio demand signal from acoustic emulator controller 27. Likewise, if acoustic emulator controller 27 has primary control, then acoustic controller 27 will be programmed to manage data signals such that upon directing operation of FG controller 24, the timing of the audio demand signal from acoustic emulator controller 27 will arrive at acoustic emulator 26 at the same time as FG(s) 22 receives the demand signal from FG controller 24. This in either configuration, acoustic emulator 26 and FG(s) 22 received the appropriate audio demand signal and demand signal in synchronization thereby producing an emulation of a vehicle powered by an ICE undergoing the operational changes determined by the indicated sensors.

The present subject matter can be embodied in other forms without departure from the spirit and essential characteristics thereof. The embodiments described herein are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A system for emulating the feel of an internal combustion engine during the operation of an electric vehicle comprising:

an electric vehicle having a chassis;

an electric motor supported by said chassis;

an accelerator, said accelerator controls operation of said electric motor;

a data source capable of providing data representative of changes in operation of said electric vehicle;

a force generator controller, said force generator controller in data communication with said data source, said force generator controller programmed to produce a first demand signal and at least one additional demand signal, the first demand signal corresponding to a first mode of operation, wherein the first mode of operation is an idle mode when the electric vehicle is in a stopped position and the at least one additional demand signal corresponding to an additional mode of operation, wherein the additional mode of operation emulates motion of the electric vehicle;

the force generator controller configured to select and produce the first demand signal or the additional demand signal in response to data received from the data source and the force generator controller configured to transmit the first demand signal or the additional demand signal to a first circular force generator secured to the chassis of the vehicle at a first location;

said first circular force generator configured to produce vibrations upon receipt of said first demand signal or the additional demand signal from said force generator controller such that the first circular force generator at the first location will convey vibrations to an interior of a passenger cabin of the vehicle wherein the vibrations emulate the mode corresponding to the first demand signal or the additional demand signal.

2. The system of claim 1, wherein said data source is a vehicle speed sensor.

3. The system of claim 1, wherein said data source is an electric motor controller.

4. The system of claim 1, wherein said data source is an accelerator position sensor and a vehicle speed sensor, wherein the additional demand signal includes data corresponding to the position of accelerator and the speed of the vehicle, the additional demand signal configured to control said first circular force generator and causes said first circular force generator to produce vibrations which emulate the speed of the electric vehicle and emulate the demand on an internal combustion engine.

5. The system of claim 1 further comprising an acoustic emulator and an acoustic emulator controller, said acoustic emulator controller in data communication with said force generator controller; and, wherein the acoustic emulator controller and the force generator controller are programmed to provide synchronous operation of the first circular force generator and the acoustic emulator.

6. The system of claim 5, wherein said acoustic emulator controller is programmed to generate an audio demand signal in response to data received from said accelerator position sensor and transmits said audio demand to said acoustic emulator.

7. The system of claim 1, wherein said system includes a second force generator secured at a second location wherein vibrations generated by said second force generator will cause movement of a first body panel of said electric vehicle.

8. The system of claim 1, wherein said demand signal includes data which controls said first circular force generator and causes said first circular force generator to produce vibrations which emulate a change in revolutions per minute of an internal combustion engine.

9. The system of claim 1, wherein the data source includes a vehicle speed sensor and an accelerator position sensor said additional demand signal includes data corresponding to the position of accelerator and the speed of the vehicle, the additional demand signal configured to control the first circular force generator and cause the causes said first circular force generator to produce vibrations which emulate a changing of gears of a vehicle driven by an internal combustion engine and an automatic transmission.

10. The system of claim 1, wherein said demand signal includes data which controls said first circular force generator and causes said first circular force generator to produce vibrations which indicated operation of said electric vehicle at a speed in excess of a predetermined maximum speed.

11. The system of claim 1, wherein said system includes a second circular force generator secured at a second location, the second circular force generator in communication with the force generator controller wherein upon receipt of the first demand signal by the second circular force generator, generation of vibrations by the second circular force generator at the second location provides for vibrations within a first body panel of said electric vehicle and the system includes a third circular force generator in communication with the force generator controller, the third circular force generator secured at a third location wherein upon receipt of the first demand signal by the third circular force generator, generation of vibrations by the third circular force generator at the third location provides for vibrations within a second body panel of said electric vehicle where such vibrations produced by the second and third circular force generators will convey vibrations to an interior of a passenger cabin of the vehicle.

12. The system of claim 11, wherein said first body panel is a hood and said second body panel is a trunk lid.

13. A system for emulating the feel of an internal combustion engine during the operation of an electric vehicle comprising:

an electric vehicle having a chassis;

an electric motor supported by said chassis;

an accelerator, said accelerator controls operation of said electric motor;

at least one data source selected from the group consisting of: an accelerator position sensor, a vehicle speed sensor, an electric motor controller;

a force generator controller, said force generator controller in data communication with said data source, said force generator controller programmed to produce a first demand signal and at least one additional demand signal, the first demand signal corresponding to a first mode of operation, wherein the first mode of operation is an idle mode when the electric vehicle is in a stopped position and the at least one additional demand signal corresponding to an additional mode of operation, wherein the additional mode of operation emulates motion of the electric vehicle;

the force generator controller configured to select and produce the first demand signal or the additional demand signal in response to data received from the data source and the force generator controller configured to transmit the first demand signal or the additional demand signal to a first circular force generator secured to the chassis of the vehicle at a first location, the first circular force generator at the first location will convey vibrations to the interior of a passenger cabin of the vehicle;

said first circular force generator configured to produce vibrations upon receipt of said first demand signal or the additional demand signal from said force generator controller such that the first circular force generator at the first location will convey vibrations to an interior of a passenger cabin of the vehicle wherein the vibrations emulate the mode corresponding to the first demand signal or the additional demand signal.

14. The system of claim 13, wherein said data source includes an accelerator position sensor and a vehicle speed sensor in data communication with said force generator controller, wherein the additional demand signal includes data corresponding to the position of accelerator and the speed of the vehicle, the additional demand signal configured to control said first circular force generator and causes said first circular force generator to produce vibrations which emulate the speed of the electric vehicle and emulate the demand on an internal combustion engine.

15. The system of claim 13, wherein said data source includes an electric motor controller and a vehicle speed sensor in data communication with said force generator controller.

16. The system of claim 13, wherein said data source includes an electric motor controller and an accelerator position sensor in data communication with said force generator controller.

17. The system of claim 13, wherein said data source includes an electric motor controller, a vehicle speed sensor and an accelerator position sensor in data communication with said force generator controller.

18. The system of claim 13, further comprising:
    an acoustic emulator sub-system, the acoustic emulator subsystem comprises:
    an acoustic emulator controller in data communication with said data source, said acoustic emulator controller programmed to generate an audio demand signal in response to data received from said data source; and,
    an acoustic emulator in data communication with said acoustic emulator controller, said acoustic emulator configured to emulate the sound of an internal combustion engine or the exhaust of an internal combustion in response to receipt of said audio demand signal from said acoustic emulator.

19. A method of emulating the feel of an internal combustion engine during the operation of an electric vehicle comprising:
    said electric vehicle comprising:
        a chassis;
        an electric motor supported by said chassis;
        an accelerator, said accelerator configured to control operation of said electric motor;
        at least one data source capable of providing data representative of changes in operation of said electric vehicle;
        a circular force generator secured to the chassis of the vehicle at a location, the vehicle having a passenger cabin, the passenger cabin having an interior;
        a force generator controller, said force generator controller programmed to receive data from said at least one data source and programmed to use the received data to generate a first demand signal and at least one additional demand signal, the first demand signal corresponding to a first mode of operation, wherein the first mode of operation is an idle mode when the electric vehicle is in a stopped position and at least one additional demand signal corresponding to an additional mode of operation wherein the additional mode of operation emulates motion of the electric vehicle;
        the force generator controller configured to select and produce the first demand signal or the additional demand signal in response to data received from the data source and the force generator controller configured to transmit said first demand signal or the additional demand signal to the first circular force generator;

said first circular force generator configured to produce vibrations upon receipt of said first demand signal or the additional demand signal from said force generator controller;
    using said data source to monitor changes in the operation of said electric vehicle and produce data representative of changes in operation of said electric vehicle;
    transmitting said data representative of changes in operation of said electric vehicle to said force generator controller;
    said force generator controller receiving said data representative of changes in operation of said electric vehicle and said force generator controller interpreting the received data and selecting the first demand signal or the additional demand signal;
    transmitting the selected first demand signal or additional demand signal from said force generator controller to said first circular force generator;
    using said first circular force generator to produce and transmit vibrations to the interior of the passenger cabin, wherein the vibrations emulate the mode corresponding to the first demand signal or the additional demand signal.

20. The method of claim 19, wherein said electric vehicle further comprises an acoustic emulator subsystem, the acoustic emulator subsystem comprising:
    an acoustic emulator; and,
    an acoustic emulator controller in data communication with said data source and/or said force generator controller, said acoustic emulator controller programmed to generate an audio demand signal in response to data received from the data source and/or the force generator controller and further comprising the steps of:
    transmitting said audio demand signal to an acoustic emulator;
    using said acoustic emulator to produce an audio signal sufficient to emulate the sound of an internal combustion engine, wherein the sound of an internal combustion engine is detectible within the passenger cabin.

21. The method of claim 20, wherein the force generator controller and the acoustic emulator controller are programmed to provide synchronous operator of the first circular force generator and the acoustic emulator and further comprising the steps of selecting either the force generator controller or the acoustic emulator controller as a primary controller and using the primary controller to manage data signals such that timing of the first demand signal or the additional demand signal from the force generator controller to the first circular force generator will arrive at the first circular force generator at the same time as the first demand signal or the additional demand signal from the acoustic emulator controller arrives at said acoustic emulator thereby producing an audio signal and a vibration sufficient to emulate the sound of an internal combustion engine and generating the vibrations of an internal combustion engine to emulate the operation of an internal combustion engine and a sensation of operating a vehicle controlled by an internal combustion engine from within the passenger compartment.

22. The method of claim 19, wherein said demand signal controls said first circular force generator and causes said first circular force generator to produce vibrations which emulate an internal combustion engine undergoing an increase in revolutions per minute.

23. The method of claim 19, wherein said demand signal controls said first circular force generator and causes said first circular force generator to produce vibrations which emulate an internal combustion engine undergoing a decrease in revolutions per minute.

24. The method of claim 19, wherein said demand signal controls said first circular force generator and causes said first circular force generator to produce vibrations which emulate a changing of gears of a vehicle driven by an internal combustion engine and an automatic transmission.

25. The method of claim 19, wherein said demand signal controls said first circular force generator and causes said first circular force generator to alert an operator of said electric vehicle to excess speed by producing vibrations which indicated operation of said electric vehicle at a speed in excess of a predetermined maximum speed.

26. The method of claim 19, wherein said at least one data source is selected from the group consisting of: a vehicle speed sensor, an accelerator position sensor and an electric motor controller.

27. A method of emulating the feel of an internal combustion engine during the operation of an electric vehicle comprising:

said electric vehicle comprising:

a chassis;

an electric motor supported by said chassis;

an accelerator, said accelerator configured to control operation of said electric motor;

at least one data source selected from the group consisting of: an accelerator position sensor, a vehicle speed sensor, an electric motor controller;

a first circular force generator secured to the chassis of the vehicle at a location, the vehicle having a passenger cabin, the passenger cabin having an interior;

a force generator controller, said force generator controller programmed to receive data from said at least one data source and programmed to use the received data to generate a first demand signal and at least one additional demand signal, the first demand signal corresponding to a first mode of operation, wherein the first mode of operation is an idle mode when the electric vehicle is in a stopped position and at least one additional demand signal corresponding to an additional mode of operation wherein the additional mode of operation emulates motion of the electric vehicle;

the force generator controller configured to select and produce the first demand signal or the additional demand signal in response to data received from the data source and the force generator controller configured to transmit said first demand signal or the additional demand signal to the first circular force generator;

said first circular force generator configured to produce vibrations upon receipt of said first demand signal or the additional demand signal from said force generator controller;

using said data source to monitor changes in the operation of said electric vehicle and produce data representative of changes in operation of said electric vehicle;

transmitting said data representative of changes in operation of said vehicle to said force generator controller;

said force generator controller receiving said data representative of changes in operation of said electric vehicle and said force generator controller interpreting the received data and selecting the first demand signal or the additional demand signal;

transmitting the selected first demand signal or additional demand signal from said force generator controller to said first circular force generator;

using said first circular force generator to produce and transmit vibrations to the interior of the passenger cabin, wherein the vibrations emulate the mode corresponding to the first demand signal or the additional demand signal emulate changes in operation of an internal combustion engine corresponding to said data representative of changes in speed of said electric vehicle and said data representative of changes in the position of said accelerator.

28. The method of claim 27, wherein said electric vehicle further comprises an acoustic emulator subsystem, the acoustic emulator subsystem comprising:

an acoustic emulator; and, an acoustic emulator controller in data communication with said data source and/or said force generator controller, said acoustic emulator controller programmed to generate an audio demand signal in response to data received from the data source and/or the force generator controller and further comprising the steps of:

transmitting said audio demand signal to an acoustic emulator;

using said acoustic emulator to produce an audio signal sufficient to emulate the sound of an internal combustion engine, wherein the sound of an internal combustion engine is detectible within the passenger cabin.

29. The method of claim 28, wherein said steps of using said acoustic emulator to produce an audio signal sufficient to emulate the sound of an internal combustion engine and generating vibrations which emulate the operation of an internal combustion engine are synchronized to produce a sensation of operating a vehicle controlled by an internal combustion engine.

30. The method of claim 27, wherein said demand signal controls said first circular force generator and causes said force generator to produce vibrations which emulate an internal combustion engine undergoing an increase in revolutions per minute.

31. The method of claim 27, wherein said demand signal controls said first circular force generator and causes said first circular force generator to produce vibrations which emulate an internal combustion engine undergoing a decrease in revolutions per minute.

32. The method of claim 27, wherein said demand signal controls said first circular force generator and causes said first circular force generator to produce vibrations which emulate a changing of gears of a vehicle driven by an internal combustion engine and an automatic transmission.

33. The method of claim 27, wherein said demand signal controls said first circular force generator and causes said first circular force generator to generate an alert when said electric vehicle exceeds a predetermined maximum speed.

* * * * *